US012091916B2

(12) United States Patent
Russell et al.

(10) Patent No.: US 12,091,916 B2
(45) Date of Patent: Sep. 17, 2024

(54) LADDER HINGE AND LADDERS INCORPORATING SAME

(71) Applicant: LITTLE GIANT LADDER SYSTEMS, LLC, Springville, UT (US)

(72) Inventors: Brian B. Russell, Saratoga Springs, UT (US); N. Ryan Moss, Mapleton, UT (US); Steve L. Puertas, Wellsville, UT (US)

(73) Assignee: LITTLE GIANT LADDER SYSTEMS, LLC, Springville, UT (US)

( * ) Notice: Subject to any disclaimer, the term of this patent is extended or adjusted under 35 U.S.C. 154(b) by 909 days.

(21) Appl. No.: 17/135,690

(22) Filed: Dec. 28, 2020

(65) Prior Publication Data

US 2021/0115734 A1 Apr. 22, 2021

Related U.S. Application Data

(63) Continuation of application No. 15/996,143, filed on Jun. 1, 2018, now Pat. No. 10,876,356.

(Continued)

(51) Int. Cl.

*E06C 1/00* (2006.01)
*E06C 1/16* (2006.01)

(Continued)

(52) U.S. Cl.

CPC .................. *E06C 7/50* (2013.01); *E06C 1/16* (2013.01); *E06C 1/383* (2013.01); *E06C 1/387* (2013.01); *E06C 7/182* (2013.01)

(58) Field of Classification Search

CPC . E05D 11/10; E05D 11/1007; E05D 11/1014; E05D 11/1021; E05D 11/1028;

(Continued)

(56) References Cited

U.S. PATENT DOCUMENTS 922,306 A 5/1909 Mead
2,533,391 A 12/1950 Miller (Continued)

FOREIGN PATENT DOCUMENTS

CN 1149661 A 5/1997
CN 1833083 A 9/2006

(Continued)

OTHER PUBLICATIONS

International Search Report and Written Opinion dated Sep. 19, 2018 for PCT Application No. PCT/US2018/035692, 6 page.

*Primary Examiner* — Daniel P Cahn
*Assistant Examiner* — Steven D Yates
(74) *Attorney, Agent, or Firm* — Dorsey & Whitney LLP

(57) ABSTRACT

A ladder may include a first pair of spaced apart members, a second pair of spaced apart members and a first pair of hinges coupling the first pair of spaced apart members with the second pair of spaced apart members. In some embodiments, each hinge may include a first hinge component including at least a first hinge plate, the first hinge plate having a notch formed therein, the notch including a first abutment wall and a second abutment wall, a second hinge component including at least a second hinge plate, and a lock mechanism having a pivot pin and a lock pin. The lock mechanism is configured for selective engagement with the notch such that the pivot pin engages the first abutment wall and the lock pin engages the second abutment wall to lock the first hinge component relative to the second hinge component in a first hinge position.

18 Claims, 9 Drawing Sheets

Related U.S. Application Data

(60) Provisional application No. 62/514,348, filed on Jun. 2, 2017.

(51) Int. Cl.
*E06C 1/383* (2006.01)
*E06C 1/387* (2006.01)
*E06C 7/00* (2006.01)
*E06C 7/18* (2006.01)
*E06C 7/50* (2006.01)

(58) Field of Classification Search
CPC ............... E05D 11/105; E05D 11/1078; E05D 2011/1035; E06C 1/16; E06C 1/22; E06C 1/383; E06C 1/387; E06C 7/00; E06C 7/18; E06C 7/50; E06C 7/182
See application file for complete search history.

(56) References Cited

U.S. PATENT DOCUMENTS

| | | | | |
|---|---|---|---|---|
| 3,139,155 | A | 6/1964 | Skeels | |
| 3,768,592 | A | 10/1973 | Higgins | |
| 3,879,146 | A | 4/1975 | Mayer | |
| 4,191,397 | A | 3/1980 | Kassai | |
| 4,293,055 | A | 10/1981 | Hooser | |
| 4,295,544 | A | 10/1981 | Peterson | |
| 4,483,415 | A | 11/1984 | Disston et al. | |
| 4,520,896 | A | 6/1985 | Disston et al. | |
| 4,540,306 | A | 9/1985 | Wang | |
| 4,543,006 | A * | 9/1985 | Wang | E06C 1/32 16/334 |
| 4,645,371 | A * | 2/1987 | Wang | F16C 11/10 182/163 |
| 4,770,559 | A | 9/1988 | Yoo | |
| 4,824,278 | A | 4/1989 | Chang | |
| 4,925,329 | A * | 5/1990 | Chuang | F16C 11/10 182/163 |
| 5,022,118 | A | 6/1991 | Wan-li | |
| 5,026,198 | A | 6/1991 | Lin | |
| 5,681,045 | A | 10/1997 | Liao | |
| 6,092,334 | A * | 7/2000 | Kim | E05F 1/006 16/334 |
| 7,047,597 | B2 | 5/2006 | Lee | |
| 7,100,739 | B2 | 9/2006 | Parker et al. | |
| 7,140,072 | B2 | 11/2006 | Leng | |
| 7,364,017 | B2 | 4/2008 | Moss et al. | |
| 7,931,123 | B2 * | 4/2011 | Moldthan | E06C 1/393 182/161 |
| 8,104,578 | B2 * | 1/2012 | Moldthan | E06C 1/387 16/365 |
| 8,186,481 | B2 | 5/2012 | Moss et al. | |
| 9,097,063 | B2 * | 8/2015 | Parker | E06C 1/18 |
| 10,246,897 | B2 | 4/2019 | Chen | |
| 10,837,229 | B2 * | 11/2020 | Yoo | E06C 7/182 |
| 10,876,356 | B2 | 12/2020 | Russell et al. | |
| 2003/0012595 | A1 * | 1/2003 | Park | E06C 1/32 403/84 |
| 2005/0121260 | A1 * | 6/2005 | Leng | E06C 1/32 182/156 |
| 2005/0268434 | A1 | 12/2005 | Burbrink et al. | |
| 2006/0102425 | A1 | 5/2006 | Moldthan et al. | |
| 2006/0239768 | A1 | 10/2006 | Yeh | |
| 2008/0276425 | A1 * | 11/2008 | Gherardi | A47L 15/4261 16/386 |
| 2009/0229918 | A1 | 9/2009 | Moss et al. | |
| 2012/0061182 | A1 * | 3/2012 | Grimes | E06C 7/50 16/332 |
| 2014/0083799 | A1 | 3/2014 | Evans | |
| 2016/0108655 | A1 * | 4/2016 | Jones | E05D 11/1007 16/319 |
| 2017/0145745 | A1 | 5/2017 | Kieffer et al. | |
| 2017/0204663 | A1 * | 7/2017 | Miao | E06C 7/50 |
| 2019/0136625 | A1 * | 5/2019 | Chen | E06C 1/18 |
| 2020/0325726 | A1 * | 10/2020 | Yoo | E06C 1/18 |
| 2021/0123302 | A1 * | 4/2021 | Caldwell | E06C 7/423 |
| 2022/0034164 | A1 * | 2/2022 | Lentine | E06C 7/50 |

FOREIGN PATENT DOCUMENTS

| | | | | |
|---|---|---|---|---|
| CN | 101960084 | A | 1/2011 | |
| CN | 103590743 | A | 2/2014 | |
| DE | 3005692 | A * | 8/1981 | E06C 1/32 |
| KR | 200146389 | Y1 | 6/1999 | |

* cited by examiner

LADDER HINGE AND LADDERS INCORPORATING SAME

CROSS-REFERENCE TO RELATED APPLICATIONS

This application is a continuation of U.S. patent application Ser. No. 15/996,143, filed on 1 Jun. 2018, which claims benefit of U.S. Provisional Pat. App. No. 62/514,348, filed 2 Jun. 2017, the disclosures of which are incorporated by reference herein in their entireties.

BACKGROUND

The present disclosure relates generally to ladders and, more particularly, to embodiments of ladders that incorporate hinges (e.g., step ladders) and related hinge assemblies. Ladders are conventionally utilized to provide a user thereof with improved access to elevated locations that might otherwise be inaccessible. Ladders come in many shapes and sizes, such as straight ladders, straight extension ladders, step ladders, and combination step and extension ladders. So-called combination ladders may incorporate, in a single ladder, many of the benefits of multiple ladder designs.

Ladders known as step ladders are self-supporting, meaning that they do not need to be leaned against a wall, pole or other structure for stability. Rather, step ladders may be positioned on a floor (or other similar surface) such that at least three, and conventionally four, feet of the ladder provide a stable support structure for a user to climb upon, even in an open space (e.g., outside or in the middle of a room) without a wall, roof, pole or other type of structure being necessary for the stability of the ladder.

Many different ladder types incorporate a hinge mechanism. Hinge mechanisms enable ladders to exhibit a variety of different configurations including, for example, stowed configurations where the ladder is folded or placed in a more compact state for stowing and transporting, as well as one or more deployed conditions, where the ladder is in a state for a user to stand on or climb. The existence of a hinge can introduce a variety of considerations into the fabrication and use of a ladder. In some instances, hinges can introduce failure points and, thus, need to be robustly designed to prevent failure of the ladder during use. Additionally, hinges can create so-called pinch points, making them a potential hazard to a user if the user is not utilizing the ladder properly. Further, in an effort to provide a hinge that is sufficiently strong, durable and ergonomic, the manufacturer must consider whether a given design is feasible from a manufacturing and cost standpoint. Thus, many factors go into the consideration in designing and manufacturing ladders and ladder components such as hinges.

It is a continued desire within the industry to provide ladders and ladder components that are safe, durable and effective tools for a user thereof. Many efforts have been and continue to be expended in an effort to improve the performance of ladders, improve the associated manufacturing processes and to provide the end user with a good experience when using ladders.

SUMMARY OF THE DISCLOSURE

Embodiments of the present disclosure are related to ladders, ladder hinges, hinge and ladder rail assemblies, and related methods. In accordance with one embodiment, a ladder comprises a first pair of spaced apart members, a second pair of spaced apart members and a first pair of hinges coupling the first pair of spaced apart members with the second pair of spaced apart members. Each hinge includes: a first hinge component including at least a first hinge plate, the first hinge plate having a notch formed therein, the notch including a first abutment wall and a second abutment wall, a second hinge component including at least a second hinge plate, and a lock mechanism having a pivot pin and a lock pin, wherein the lock mechanism is configured for selective engagement with the notch such that the pivot pin engages the first abutment wall and the lock pin engages the second abutment wall to lock the first hinge component relative to the second hinge component in a first hinge position.

In one embodiment, the pivot pin and the lock pin are coupled to one another by at least one plate member.

In one embodiment, the pivot pin extends through a first opening of the second hinge plate and a first opening of the at least one plate member.

In one embodiment, the lock pin extends through a second opening of the second hinge plate and a second opening of the at least one plate member.

In one embodiment, the second opening of the second hinge plate comprises an elongated slot and wherein the second opening of the at least one plate member comprises an elongated slot.

In one embodiment, the elongated slot of the second hinge plate extends along a first axis and the elongated slot of the at least one plate member extends along a second axis, the first and second axes being at oriented at an angle relative to one another.

In one embodiment, the lock pin is biased into engagement with the second abutment wall when the first hinge component and the second hinge component are in the first hinge position.

In one embodiment, the first abutment wall exhibits a greater length than the second abutment wall, and wherein the pivot pin is located at a greater radial distance from a pivoting axis of the first and second hinge components than the lock pin when the first hinge component and the second hinge component are in the first hinge position.

In one embodiment, the notch is tapered such that the first abutment wall and the second abutment wall are oriented at an angle relative to one another.

In one embodiment, the second hinge component includes a third hinge plate spaced apart from the second hinge plate, and wherein the first hinge plate is positioned between the second and third hinge plates.

In one embodiment, the first pair of spaced apart members includes a first pair of rails, and wherein the second pair of spaced apart members includes a pair of post members of a handrail.

In one embodiment, the handrail includes a top cap extending between the pair of post members.

In one embodiment, the top cap includes at least one of a storage compartment and a tool holder.

In one embodiment, the ladder further comprises a second pair of rails pivotally coupled with the first pair of rails.

In one embodiment, the ladder further comprises plurality of rungs extending between and coupled with the second pair of rails.

In one embodiment, each of the plurality of rungs is pivotally coupled with the second pair of rails.

In one embodiment, each rail of the second pair of rails includes a first rail component and a second rail component, and wherein each rung of the plurality of rungs is separately pivotally coupled with the first rail component and the second rail component.

In one embodiment, the ladder further comprises a pair of spreader members extending between and coupled with the first pair of rails and the second pair of rails.

In one embodiment, each spreader member is separately coupled with the first rail component and the second rail component.

In one embodiment, the first pair of spaced apart members includes a first pair of rails, and wherein the second pair of spaced apart members includes a second pair of rails.

Features, elements or components of one embodiment described herein may be combined with features elements or components of other embodiments described herein without limitation.

BRIEF DESCRIPTION OF THE DRAWINGS

The foregoing and other advantages of the invention will become apparent upon reading the following detailed description and upon reference to the drawings in which.

DETAILED DESCRIPTION

Figure 1:
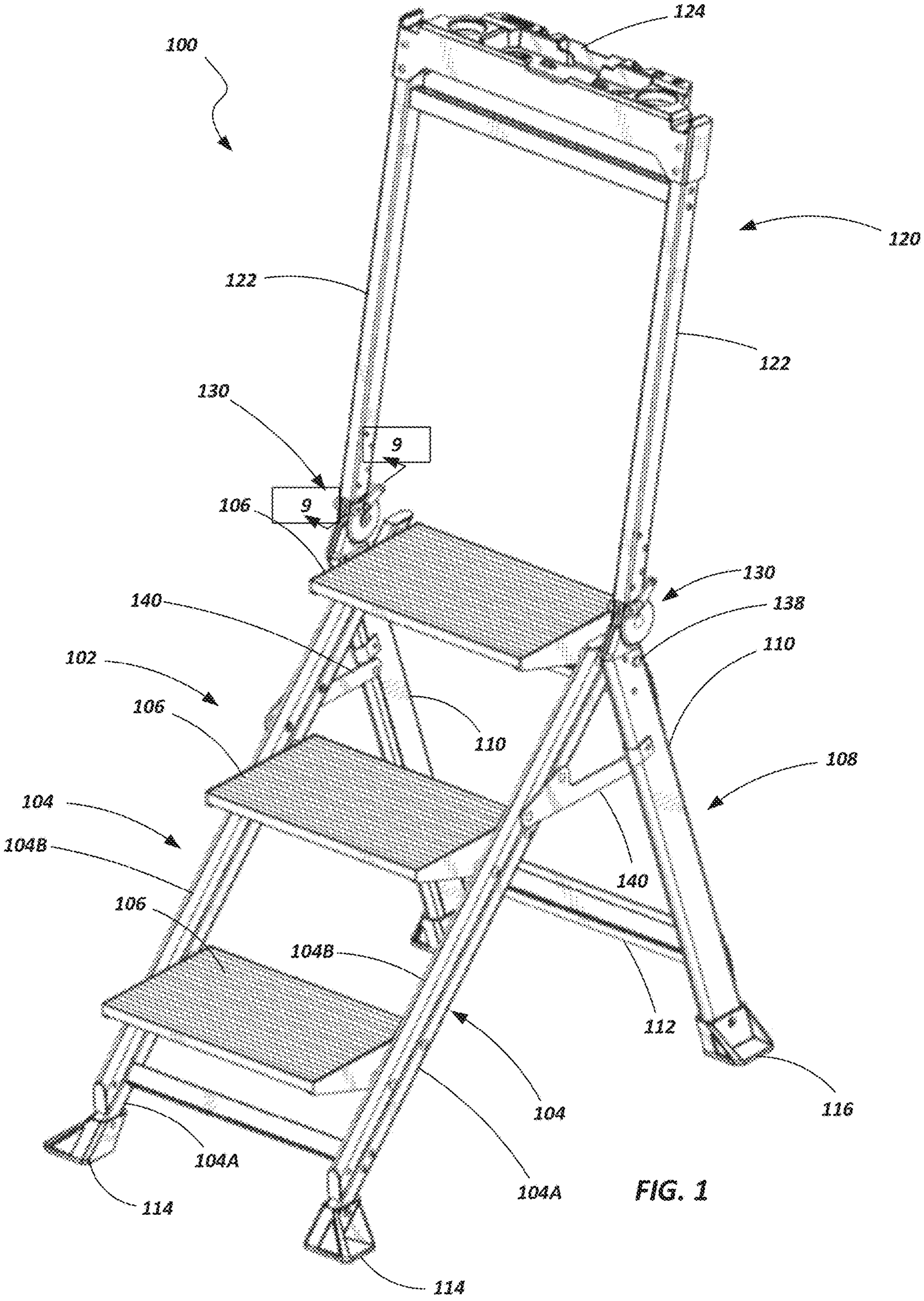
FIG. 1 is a perspective view of a step ladder according to an embodiment of the present invention.
Figure 2:
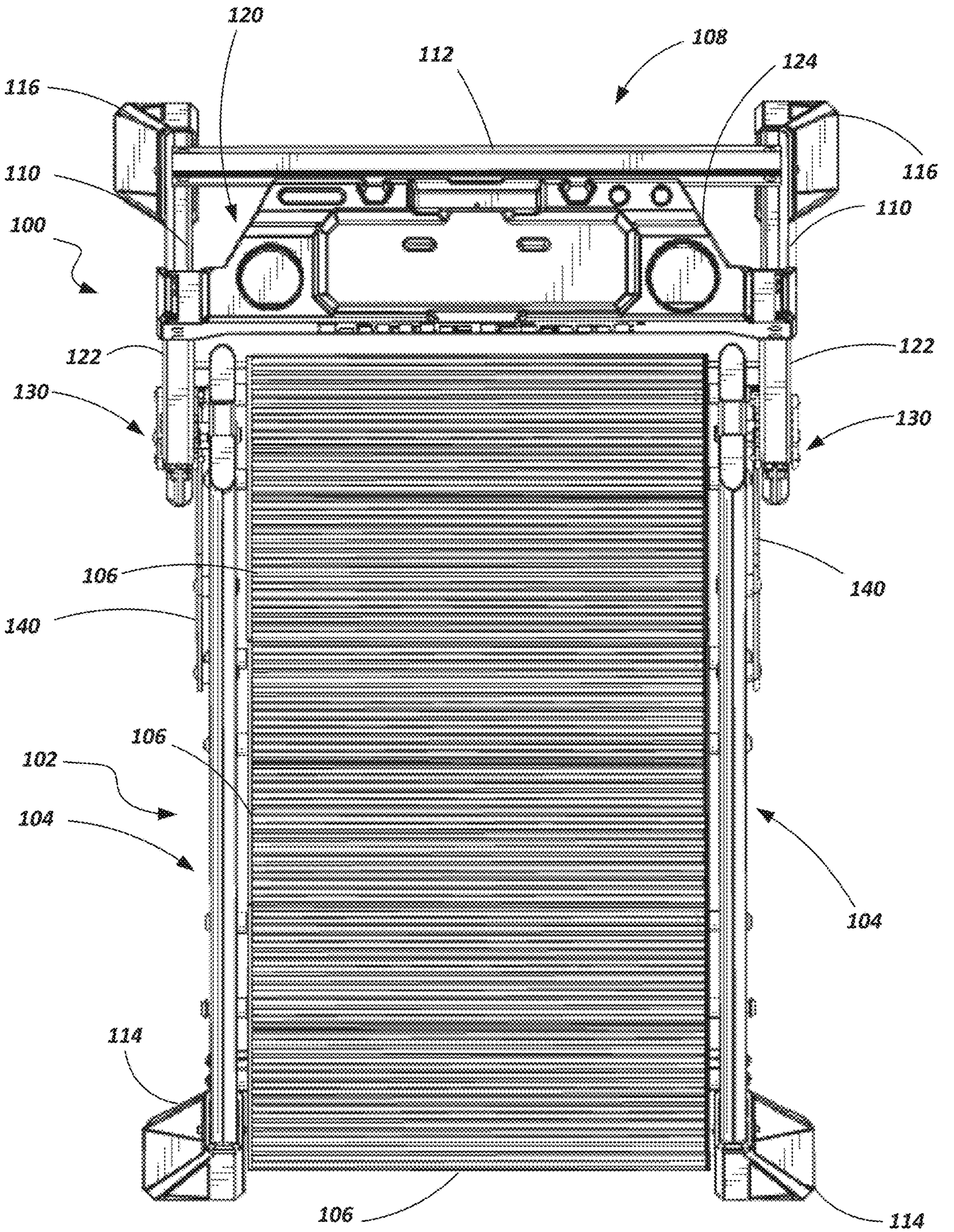
FIG. 2 is a top view of the step ladder shown in FIG. 1.
Figure 3:
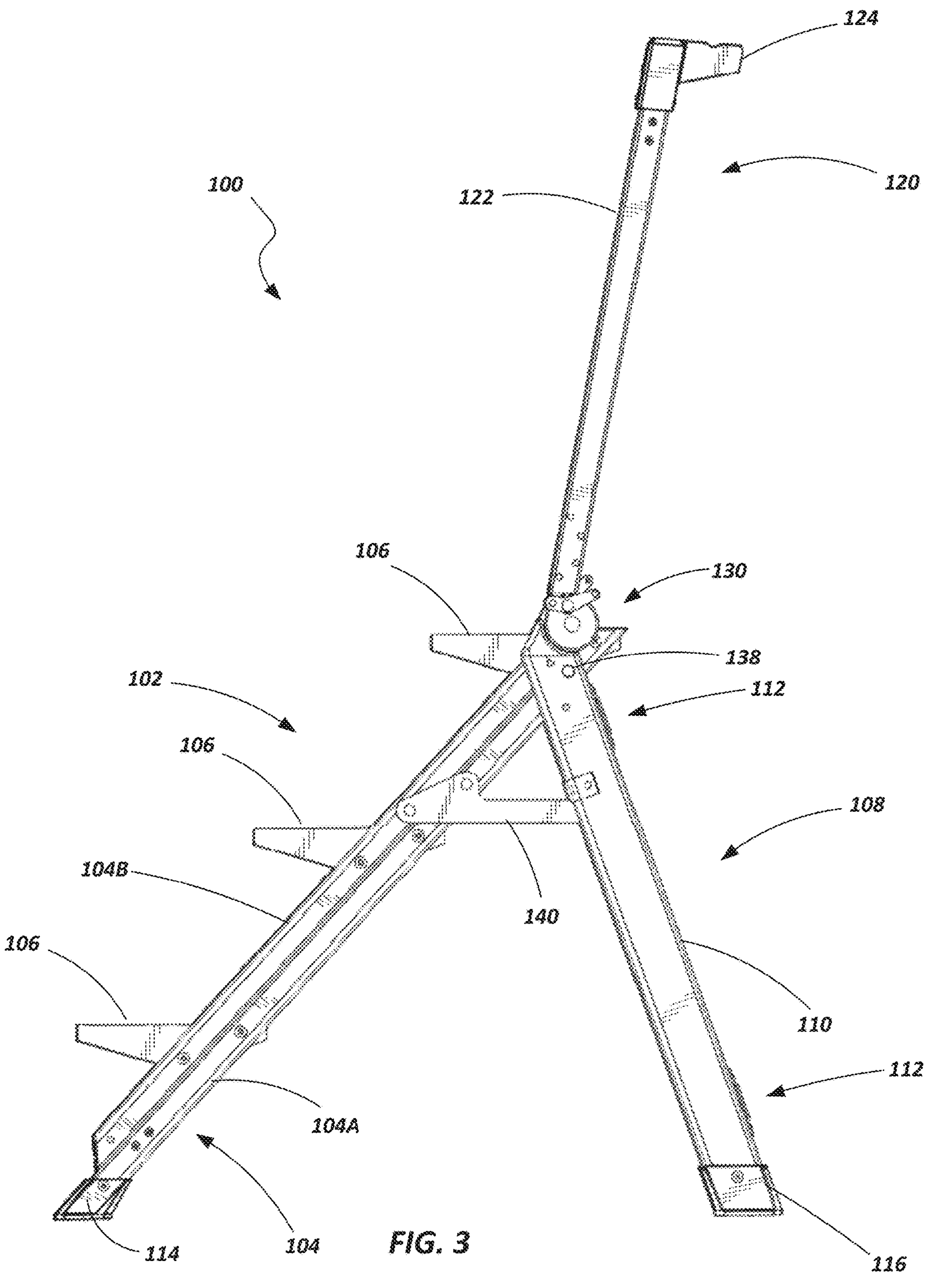
FIG. 3 is a side view of the step ladder shown in FIGS. 1 and 2 with the ladder in a first configuration or state.

Referring to FIGS. 1-3 a stepladder 100 is shown in accordance with an embodiment of the present invention. The stepladder 100 includes a first assembly 102 having a pair of spaced apart rails 104 and a plurality of rungs 106 extending between, and coupled to, the rails 104. When the ladder 100 is in an orientation of intended use, such as shown in FIG. 1, the rungs 106 are vertically spaced from one another, are substantially parallel to one another and are configured to be substantially level so that the rungs 106 may be used as "steps" for a user to ascend the stepladder 100 as will be appreciated by those of ordinary skill in the art. In various embodiments, the upper surface of the rungs 106 may include traction features (e.g., grooves and ridges, grip tape, rubberized coverings or other anti-slip features) to provide traction to a user while standing on the rungs 106. As will be discussed in further detail below, each rail 104 of the first assembly 102 includes two longitudinally extending rail components (104A and 104B) positioned adjacent to each other, with each component being independently coupled to the associated rungs 106.

The stepladder 100 also includes a second assembly 108 having a pair of spaced apart rails 110. In the embodiment shown, one or more cross-braces 112 extend between, and are coupled to, the spaced apart rails 110. The cross-braces 112 provide a desired level of strength and rigidity to the second assembly 108, but they are not necessarily configured as rungs (i.e., they may not be intended to support a user). Thus, the second assembly 108 shown in FIGS. 1-5 does not include a plurality of rungs between the spaced apart rails 110. However, in some embodiments, the second assembly 108 may include rungs if desired. The second assembly 108 is used to help support the stepladder 100 when spaced apart from the first assembly 102 and when the ladder 100 is in an intended operational state, such as depicted in FIG. 1.

A first pair of feet 114 may be coupled with the lower portion of the rails 104 (e.g., rail component 104A) of the first assembly 102 and a second pair of feet 116 may be coupled with the lower portions of the rails 110 of the second assembly 108. The feet 114 and 116 may provide a variety of functions including, for example, protecting a support surface (e.g., a wood floor) from scuffs and scratches when the ladder is placed thereon, as well as providing increased friction or "grip" of the ladder 100 while it is positioned on a supporting surface.

The first and second assemblies 102 and 108 may be formed of a variety of materials using any of a variety of appropriate manufacturing techniques. For example, in one embodiment, the rails 104 and 110 as well as the rungs 106 may be formed of a metal or metal alloy, such as aluminum. In other embodiments, the assemblies 102 and 108 (and their various components) may be formed of other materials including composites, plastics, polymers, metals, metal alloys and combinations thereof.

A handrail 120 is hingedly coupled with the second assembly 108. In one embodiment, the handrail 120 may include a pair of post members 122 and a connecting member extending between the pair of post member 122, such as a top cap 124, a tool tray, or a structural component such as a bar. In various embodiments, the top cap 124 may include features that enable it to be used as a tray or a tool holder. Thus, the top cap 124 may be used to organize a user's tools and resources (including, for example, a cell phone or other electronic device) while working on the stepladder 100. For example, such a top cap is described in U.S. Pat. No. 8,186,481 issued May 29, 2012 and entitled LADDERS, LADDER COMPONENTS AND RELATED METHODS, the disclosure of which is incorporated by reference herein in its entirety.

As seen in FIGS. 1-3, when in a deployed configuration, the handrail 120 is configured to extend substantially upwards from the second assembly 108 positioning the top cap 124 substantially above the uppermost rung 106. When in this configuration, the top cap 124 is positioned at a height such that a person standing on the top rung 106 may grasp the top cap 124 (or some other portion of the handrail 120) for stability, and also easily access tools or supplies held by various compartments of the top cap 124.

It is noted that, in the configuration shown in FIGS. 1-3, the top cap 124 is positioned high enough above the top rung 106 that it is not configured as a "rung" or a "step" and is not intended to support a user's standing weight. In some embodiments, the top cap 124 may be positioned approximately 2.5 and approximately 3.5 feet above the most adjacent rung 106 (e.g., above the uppermost rung) when in the deployed position.

A pair of hinges 130 couple the handrail 120 and the second assembly 108 together, enabling the handrail 120 to be selectively positioned at two or more positions relative to the second assembly 108. For example, as noted above, the hinges 130 enable the handrail 120 to be securely locked in a deployed state such as shown in FIGS. 1-3. The hinges 130 further enable the handrail 120 to be positioned in a stored state, wherein it is folded down such that the post members

Figure 4:
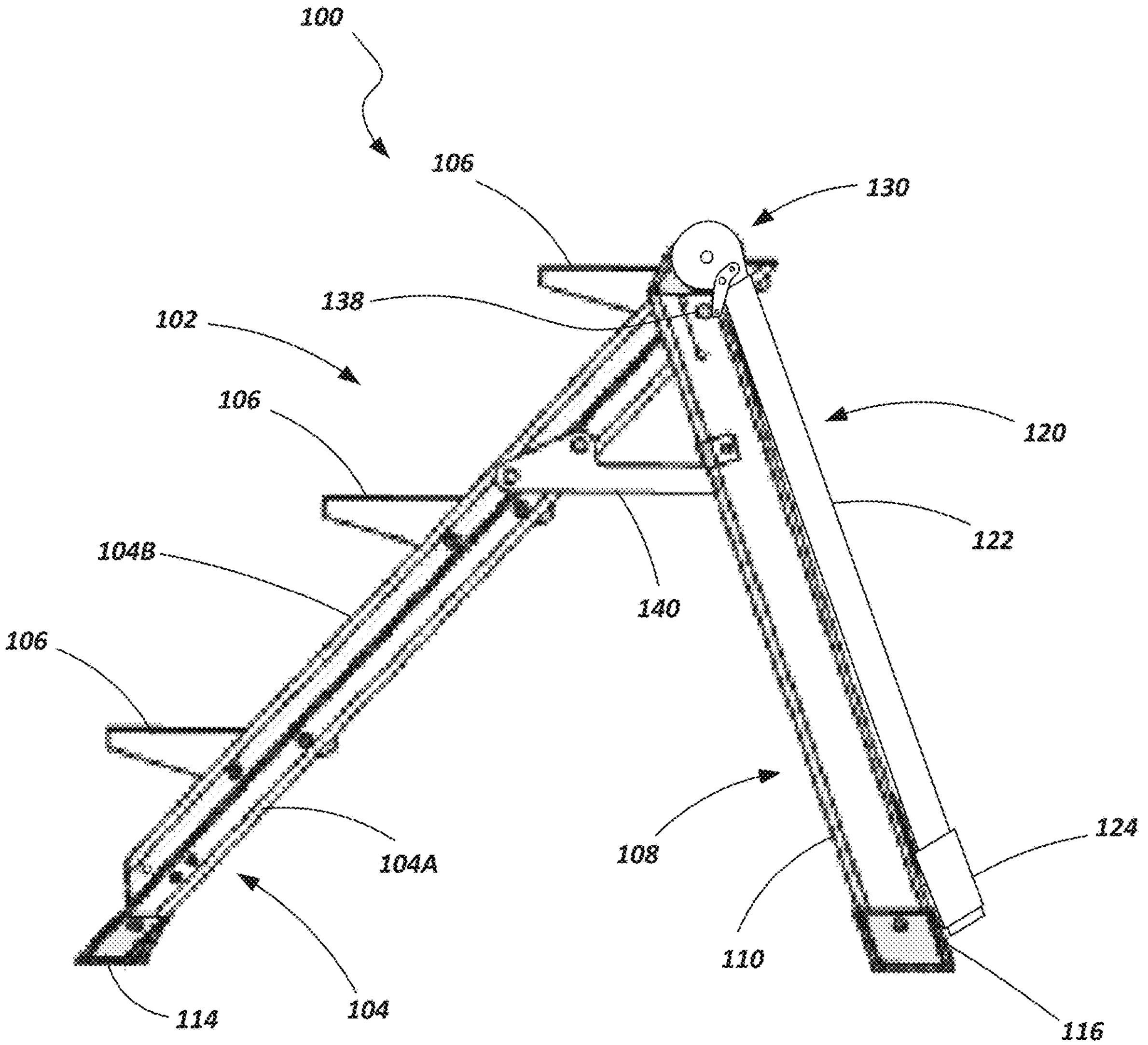
FIG. 4 is a side view of the step ladder shown in FIGS. 1-3 with the ladder in a second configuration or state.

122 are positioned adjacent to, and extend substantially parallel with, the rails 110 of the second assembly, such as shown in FIG. 4.

The ladder 100 may be further collapsed such that the entire ladder 100 may be placed in a stowed state for purposes of storage or transport. For example, as previously noted, the rails 104 of the first assembly 102 each include two separate rail components 104A and 104B. Each rail component 104A and 104B are separately pivotally coupled with each rung 106. Additionally, one of the rail components (e.g. 104A) of each rail 104 is pivotally coupled with an associated rail 110 of the second assembly 108 about a pivot member 138.

Further, a pair of spreader members 140 are pivotally coupled between the first and second assemblies 102 and 108. Each spreader member 140 includes one end pivotally coupled to an associated rail 110 of the second assembly 108 and a second end that is pivotally coupled with an associated first rail 104 of the first assembly 102. In some embodiments, the spreader member 140 may be independently pivotally coupled with the first component 104A at a first location and pivotally coupled with an associated second rail component 104B at a second location.

Figure 5:
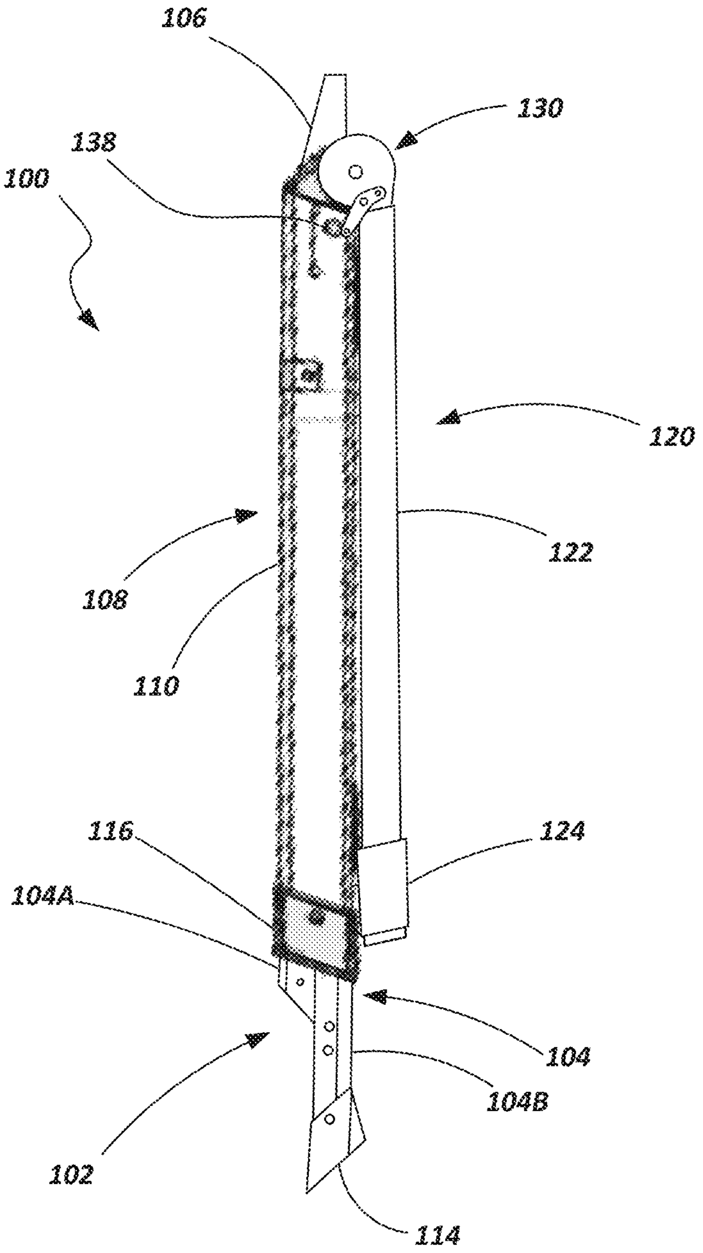
FIG. 5 is a side view of the step ladder shown in FIGS. 1-4 with the ladder in a third configuration or state.

The arrangement of the rails 104 (including the separate rail components 104A and 104B) of the first assembly 102, the rails 110 of the second rail assembly 108, the rungs 106 and the spreader members 140, enable the first assembly 102 and the second assembly 108 to collapse to place the ladder 100 in a stowed state or configuration as shown in FIG. 5. When in the stowed state, the rails 104 of the first assembly 102 are positioned adjacent the rails 110 of the second assembly 108 and the rungs 106 all pivot such that their upper faces (i.e., the surface on which a user stands) are substantially parallel with the rails 104 of the first assembly 102 while facing the second assembly 108. Thus, when folded into the stowed state, the rungs 106 are positioned within a depth-envelope (e.g., the depth measured between opposing front and rear surfaces of the ladder 100) defined by the rails 110 of the second assembly 108. This is accomplished, in part, by each second rail component 104B sliding longitudinally relative to its associated first rail component 104A during pivoting of the two assemblies 102 and 108 as can be seen be comparing the position of the lower end of the second rail component 104B relative to the feet 114 in FIGS. 4 and 5.

It is noted that the overall depth or thickness of the ladder 100 when in the collapsed or stowed state is approximately equal to the combined depth or thickness of the rails 110 of the second assembly and the handrail 120 as can be seen in FIG. 5. As also seen in FIG. 5, a portion of the top cap 124 may extend into the envelope defined by the depth of the rails 110 of the second assembly 108.

Referring now to FIGS. 6-9, various views of the hinges 130 are shown. Each hinge 130 includes a first hinge component 150 having a hinge plate 152 (also referred to as a hinge tongue herein), the first hinge component 150 being coupled with a rail 110 of the second assembly 108. Each hinge 130 also includes a second hinge component 160 which is coupled with a post member 122 of the handrail 120. The second hinge component 160 is configured with a slot or groove 162 for receipt of the tongue portion 152 of the first hinge component 150. Openings 166 and 168 in the hinge components 150 and 160 receive a pivot member 170 (such as a pin, bolt, rivet, or other member) to couple the hinge components 150 and 160 together while also enabling the hinge components 150 and 160 to rotate relative to each other about an axis defined by the pivot member 170.

Figure 7:
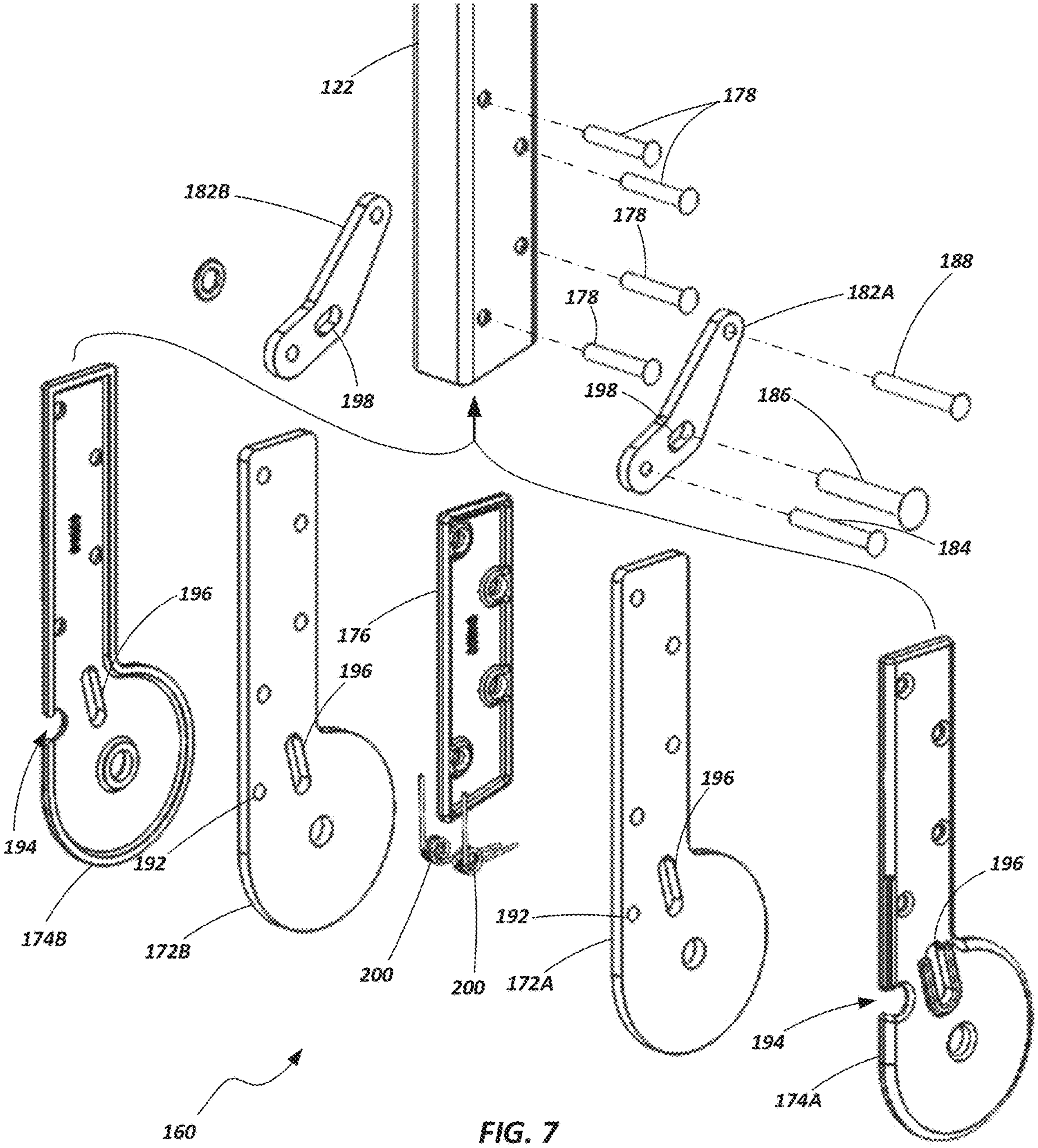
FIG. 7 is an exploded view of a portion of a step ladder according to an embodiment of the present disclosure.
Figure 8:
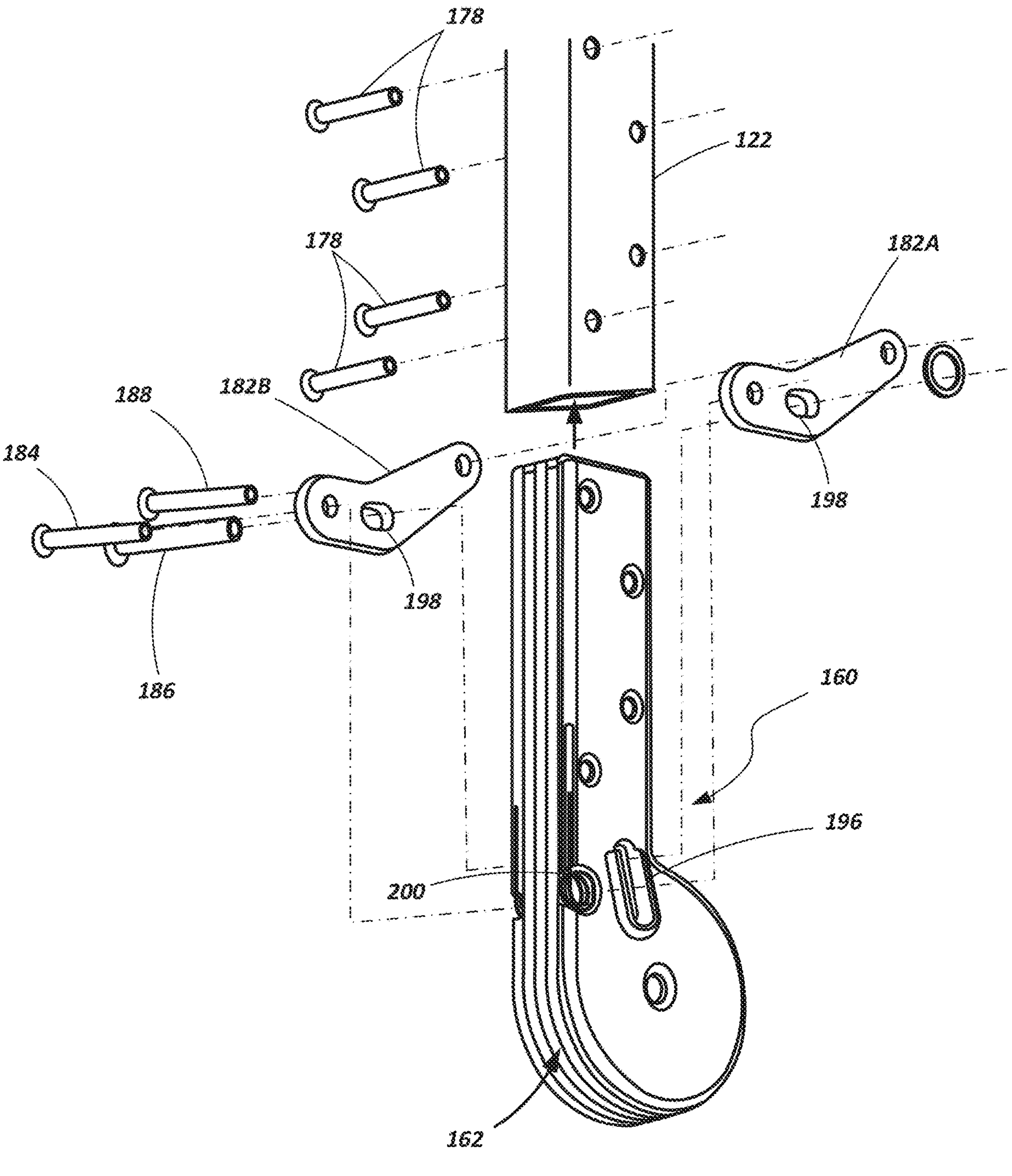
FIG. 8 is a partially exploded view of the step ladder portion shown in FIG. 7.

As best seen in FIGS. 7 and 8, the second hinge component 160 may include numerous members including, for example, a pair of hinge plates 172A and 172B, a pair of cover plates 174A and 174B, and a spacer 176 positioned between the hinge plates 172A and 172B to define the slot or groove 162 for receipt of the tongue portion 152 of the first hinge component 150. The hinge plates 172A and 172B, the cover plates 174A and 174B and the spacer 176 may each be partially inserted into an interior portion of an associated post member 122 of the handrail 124. Fasteners 178 (e.g., rivets, bolts, etc.) may be used to couple the second hinge component 160 with the post member 122.

Still referring to FIGS. 6-9, each hinge 130 includes a lock mechanism 180 configured to lock the second hinge component 160 at one or more desired positions relative to the first hinge component 150. In one embodiment, the lock mechanism 180 may include a pair a plate members 182A and 182B, a pivot pin 184, a lock pin 186 and a coupling pin 188. The various pin members may comprise any of a variety of structural and/or fastening components including bolts, rivets, bars, rods, pins or the like. The plate members 182A and 182B are coupled together by the various pins 184, 186 and 188 such that the plate members 182A and 182B may be displaced as a unit relative to the second hinge component 160.

The pivot pin 184 extends through openings 192 formed in the hinge plates 172A and 172B and openings 194 formed in the cover plates 174A and 174B, coupling the plate members 182A and 182B of the lock mechanism 180 together and enabling them to pivot relative to the second hinge component 160 about an axis defined by the pivot pin 184.

The lock pin 186 extends through slotted openings 196 formed in each of the hinge plates 172A and 172B and cover plates 174A and 174B. The lock pin 186 also extends through slotted openings 198 of the plate members 182A and 182B. When assembled, the longitudinal axes of the slotted openings 196 for the hinge plates 172A and 172B and the cover plates 174A and 174B (while parallel and aligned with each other) are not parallel with the longitudinal axes of the slotted openings 198 of the plate members 182A and 182B. In fact, as seen in FIG. 9, the longitudinal axes of the slotted openings 198 of the plate members 182A and 182B (which may also be parallel to each other) are nearly perpendicular to the longitudinal axes of the slotted openings 196 of the hinge components 182A and 182B depending, for example, on the rotated position of the plate members 182A and 182B relative to the second hinge component 160.

Figure 9:
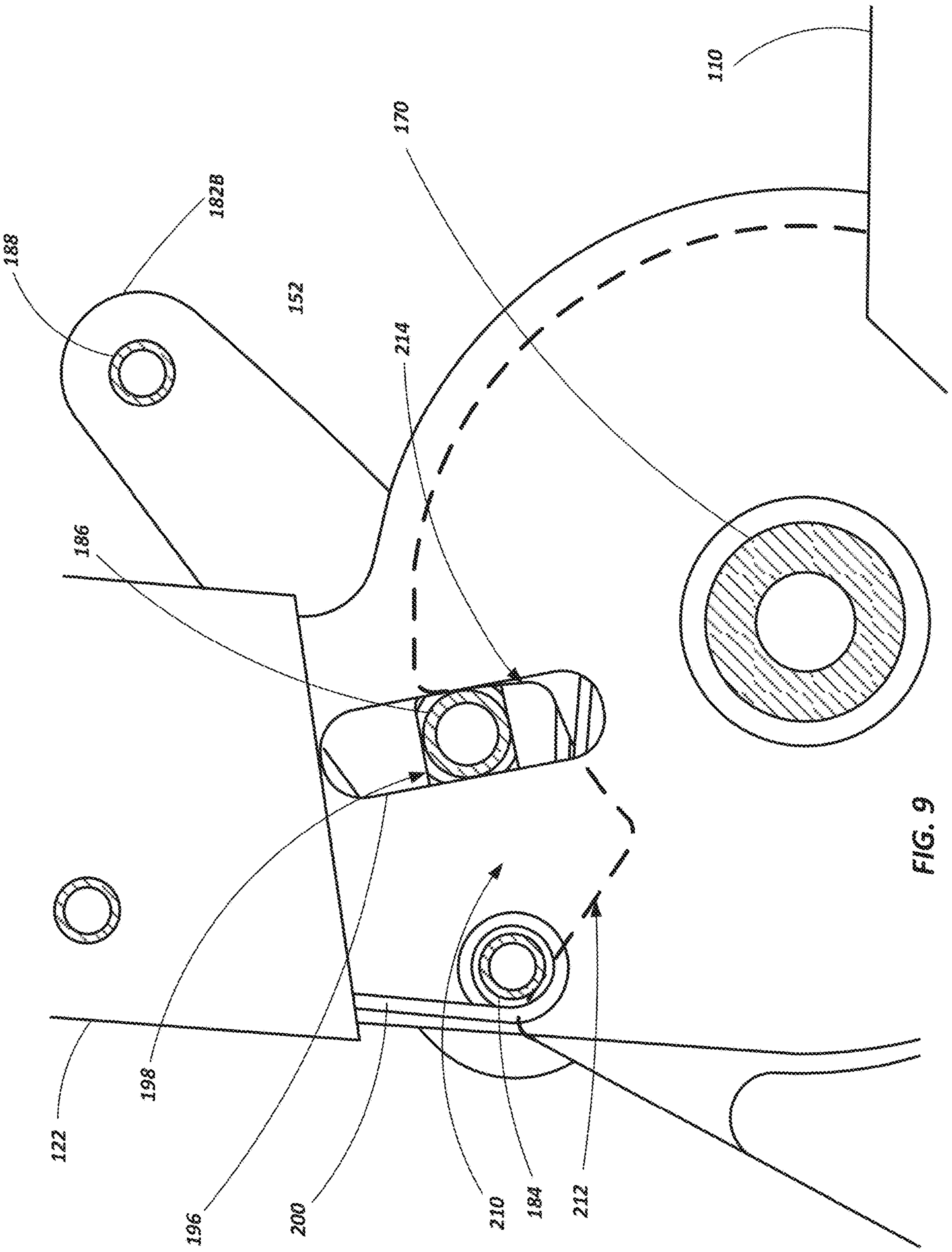
FIG. 9 is a side view of a portion of a step ladder according to an embodiment of the present disclosure.

One or more springs 200 or other biasing members is positioned between portions of the lock mechanism 180 and the second hinge component 160 to bias the lock mechanism toward a locked state (i.e., biasing the coupling pin 188 away from the post member 122, or biasing the locking plates 182A and 182B in a clockwise direction about the pivot pin 184 in the view shown in FIG. 9). In one embodiment, such as shown in FIGS. 7 and 9, the springs 200 may include torsion springs positioned about the pivot pin 184 and having one leg engaging the post member 122 and another leg engaging some component of the lock member (e.g., a lock plate or the lock pin).

Figure 6:
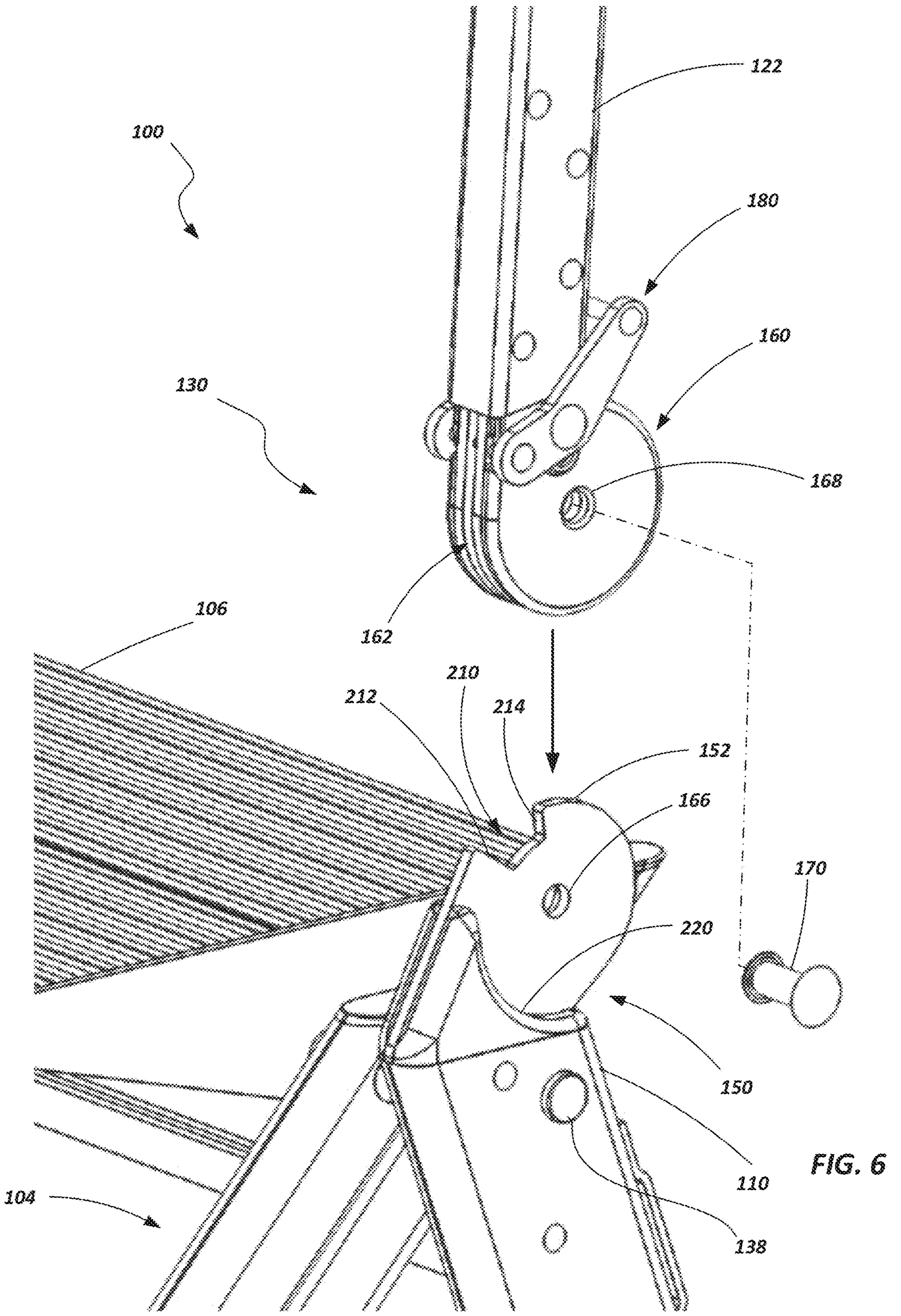
FIG. 6 is an enlarged and partially exploded view of a portion of the step ladder shown in FIG. 1.

As seen in FIGS. 6 and 9 (shown in dashed lines in FIG. 9), the tongue portion 152 of the first hinge component 150 includes a notch 210 providing two abutment walls 212 and 214 for engagement with the pivot pin 184 and the lock pin 186, respectively. In one embodiment, the abutment walls 212 and 214 may be form a defined angle between them, providing a tapered configuration to the notch 210. In one embodiment, the notch 210 may be formed as a portion of an arc sector.

As seen in FIG. 9 (with reference to the notch 210 shown by dashed lines), the pivot pin 184 engages the first abutment wall 212 of the notch 210 and the lock pin 186 engages the second abutment wall 214 of the notch 210 to lock the first hinge component 150 relative to the second hinge component 160 in a first deployed condition (e.g., such as associated with the deployed condition of the handrail 120 as shown in FIGS. 1 and 3). The engagement of the pivot pin 184 and the lock pin 186 with the abutment walls 212 and 214 prevents the two hinge components 150 and 160 from rotating about the pivot member 170. When it is desired to rotate the hinge components 150 and 160 relative to each other, the lock mechanism 180 is pivoted about pivot pin 184, causing the lock pin 186 to become disengaged from the second abutment wall 214 of the notch 210 and enabling the second hinge component 160 (along with the lock mechanism 180 which is coupled therewith) to rotate about the pivot member 170 relative to the first hinge component 150.

It is noted that the first abutment wall 212 may be longer, or extend a greater distance from the rotational axis defined by the pivot member 170, than the second abutment wall 214. Thus, as the second hinge component 160 and associated lock mechanism 180 rotate relative to the first hinge component 150, the pivot pin 184 does not abut or engage the second abutment wall 214.

It is also noted that the tapered relationship of the abutment walls 212 and 214 of the notch 210 provides an additional advantage of accounting for wear of the components over time and through repeated use. For example, as the second abutment wall 214 begins to wear through repeated engagement and disengagement of the lock pin 186 therewith, the tapered configuration of the wall 214, in cooperation with the spring biased lock mechanism 180 and slotted openings 194, 196 and 198, enable the lock pin 186 to continually provide a "positive lock" between the hinge components 150 and 160. Thus, the hinge is configured to limit slop or play between the hinge components 150 and 160 even after experiencing wear on critical surfaces or components due to repeated use.

With reference to FIG. 6, it is noted that the first hinge component 150 may include shoulders 220 (e.g., one on each side of the hinge plate 152) that are configured for abutting engagement with portions of the first hinge component 160 such as the outer surfaces of the hinge plates 172A and 172B and cover plates 174A and 174B. Thus, for example, the shoulders 220 may exhibit a radius or other arcuate surface that correspondingly mates with the radius or other arcuate surface of the second hinge component 160. Such a configuration may provide added strength to the handrail 120 when locked in a specific position. Examples of hinges utilizing engaging abutment surfaces are described in U.S. Pat. No. 7,364,017, issued on Apr. 29, 2008, the disclosure of which is incorporated by reference herein in its entirety.

While the hinge mechanisms described hereinabove are shown and described in conjunction with hingedly coupling a handrail with another component of a ladder (e.g., a rail of assembly 102 or assembly 108), the hinge may be used in conjunction with selective positioning of a variety of other ladder components, including, for example, the two assemblies 102 and 108, relative to one another.

While the invention may be susceptible to various modifications and alternative forms, specific embodiments have been shown by way of example in the drawings and have been described in detail herein. However, it should be understood that the invention is not intended to be limited to the particular forms disclosed. Additionally, features of one embodiment may be combined with features of other embodiments without limitation. The invention includes all modifications, equivalents, and alternatives falling within the spirit and scope of the invention as defined by the following appended claims.

What is claimed is:

1. A ladder comprising:
- a first pair of spaced apart rails;
- a second pair of spaced apart rails pivotally coupled with the first pair of spaced apart rails;
- a pair of posts;
- a cross-member extending between and coupled with the pair of posts;
- a pair of hinges coupling the second pair of spaced apart rails with the pair of posts, wherein each hinge includes:
  - a first hinge component including at least a first hinge plate, the first hinge plate having a single notch formed therein, the single notch including a first abutment wall and a second abutment wall,
  - a second hinge component including at least a second hinge plate,
  - a lock mechanism having a pivot pin and a lock pin, wherein the lock mechanism is configured for selective engagement with the single notch such that the pivot pin engages the first abutment wall and the lock pin engages the second abutment wall to lock the first hinge component relative to the second hinge component in a first hinge position.

2. The ladder of claim 1, wherein the pivot pin and the lock pin are coupled to one another by at least one plate member.

3. The ladder of claim 2, wherein the pivot pin extends through a first opening of the second hinge plate and a first opening of the at least one plate member.

4. The ladder of claim 3, wherein the lock pin extends through a second opening of the second hinge plate and a second opening of the at least one plate member.

5. The ladder of claim 4, wherein the second opening of the second hinge plate comprises an elongated slot and wherein the second opening of the at least one plate member comprises an elongated slot.

6. The ladder of claim 5, wherein the elongated slot of the second hinge plate extends along a first axis and the elongated slot of the at least one plate member extends along a second axis, the first and second axes being at oriented at an angle relative to one another.

7. The ladder of claim 1, wherein the lock pin is biased into engagement with the second abutment wall when the first hinge component and the second hinge component are in the first hinge position.

8. The ladder of claim 1, wherein the first abutment wall exhibits a greater length than the second abutment wall, and wherein the pivot pin is located at a greater radial distance from a pivoting axis of the first and second hinge components than the lock pin when the first hinge component and the second hinge component are in the first hinge position.

9. The ladder of claim 1, wherein the single notch is tapered such that the first abutment wall and the second abutment wall are oriented at an angle relative to one another.

10. The ladder of claim 1, wherein the second hinge component includes a third hinge plate spaced apart from the second hinge plate, and wherein the first hinge plate is positioned between the second and third hinge plates.

11. The ladder of claim 1, further comprising at least one rung extending between and coupled with the first pair of spaced apart rails.

12. The ladder of claim 11, wherein the at least one rung includes a plurality of rungs.

13. The ladder of claim 11, wherein the at least one rung is pivotally coupled with the first pair of spaced apart rails.

14. The ladder of claim 13, wherein the cross-member is a top cap.

15. The ladder of claim 14, wherein the top cap includes at least one of a storage compartment and a tool holder.

16. The ladder of claim 1, further comprising a pair of spreader members extending between and coupled with the first pair of rails and the second pair of rails.

17. A ladder comprising:
- a first pair of spaced apart rails;
- a second pair of spaced apart rails pivotally coupled with the first pair of spaced apart rails;
- a pair of posts;
- a cross-member extending between and coupled with the pair of posts;
- a pair of hinges coupling the second pair of spaced apart rails with the pair of posts, wherein each hinge includes:
  - a first hinge component including at least a first hinge plate, the first hinge plate having a notch formed therein, the notch including a first abutment wall and a second abutment wall;
  - a second hinge component including at least a second hinge plate; and
  - a lock mechanism having a pivot pin and a lock pin, wherein the pivot pin and the lock pin are configured for selective engagement with the notch;
- wherein the pivot pin is movable between a first position contacting the first abutment wall and a second position out of contact with the first abutment wall, and
- wherein the lock pin is movable between a first position contacting the second abutment wall and a second position out of contact with the second abutment wall.

18. A ladder comprising:
- a first pair of spaced apart rails;
- a second pair of spaced apart rails pivotally coupled with the first pair of spaced apart rails;
- a pair of posts;
- a cross-member extending between and coupled with the pair of posts;
- a pair of hinges coupling the second pair of spaced apart rails with the pair of posts, wherein each hinge includes:
  - a first hinge component including at least a first hinge plate, the first hinge plate having a notch formed therein, the notch including a first abutment wall and a second abutment wall,
  - a second hinge component including at least a second hinge plate,
  - a lock mechanism including:
    - a lock mechanism member,
    - a pivot pin extending from the lock mechanism member and pivotally coupling the lock mechanism member with the second hinge component, and
    - a lock pin extending from the lock mechanism member, wherein the pivot pin and the lock pin are simultaneously engageable with the first abutment wall and the second abutment wall, respectively, to lock the first hinge component relative to the second hinge component in a first hinge position.

* * * * *